United States Patent [19]

Ishikawa et al.

[11] Patent Number: 4,976,552

[45] Date of Patent: Dec. 11, 1990

[54] SEWING MACHINE OF A SEWING MACHINE BY WIRELESS CONTROLLER

[75] Inventors: Satoru Ishikawa; Toshitaka Toyomi, both of Tokyo, Japan

[73] Assignee: Janome Sewing Machine Company Limited, Tokyo, Japan

[21] Appl. No.: 354,149

[22] Filed: May 19, 1989

[30] Foreign Application Priority Data

May 20, 1988 [JP] Japan .................. 63-121879

[51] Int. Cl.$^5$ ............................................. H02P 5/04
[52] U.S. Cl. ..................... 388/811; 388/824;
318/446; 318/480; 318/663; 112/277
[58] Field of Search ........................ 112/275, 277, 300;
318/640, 663, 671–672, 821, 446, 449, 480;
388/809–815, 824

[56] References Cited

U.S. PATENT DOCUMENTS

| | | | |
|---|---|---|---|
| 3,808,485 | 4/1974 | Sakai et al. | 318/640 X |
| 3,845,375 | 10/1974 | Stiebel | 318/480 X |
| 4,168,455 | 9/1979 | Soeda et al. | 318/817 |
| 4,274,037 | 6/1981 | Soeda | 388/817 |
| 4,283,666 | 8/1981 | Kemmel | 388/822 |
| 4,299,182 | 11/1981 | Tanaka | 388/840 X |
| 4,301,757 | 11/1981 | Tonomura | 112/59 X |
| 4,326,473 | 4/1982 | Kigawa | 112/456 |
| 4,332,208 | 6/1982 | Watasue et al. | 112/277 |
| 4,386,301 | 5/1983 | Neki et al. | 112/277 X |
| 4,498,078 | 2/1983 | Yoshimura et al. | 112/277 X |
| 4,528,489 | 7/1985 | Volk, Jr. | 318/480 |
| 4,618,804 | 10/1986 | Iwasaki | 318/480 X |
| 4,648,339 | 3/1987 | Fujikawa | 112/277 |

Primary Examiner—William M. Shoop, Jr.
Assistant Examiner—David Martin
Attorney, Agent, or Firm—Frishauf, Holtz, Goodman & Woodward

[57] ABSTRACT

A sewing machine having a wireless controller is disclosed, wherein the sewing machine substantially comprising a drive motor for driving the sewing machine, a separate controller adjustably operated to produce a variable set voltage for controlling the rotation speed of the drive motor, a converter for converting the set voltage to a corresponding digital value and producing a series of data on the basis of the digital value, a device for producing carrier waves, modulator for modulating the series of data by way of the carrier waves and producing modulated waves, transmitter means responsive to the modulated waves to produce a corresponding light signal, means for receiving the light signal, demodulator for demodulating the received light signal, and a device responsive to the demodulated light to control the rotation speed of said drive motor.

11 Claims, 9 Drawing Sheets

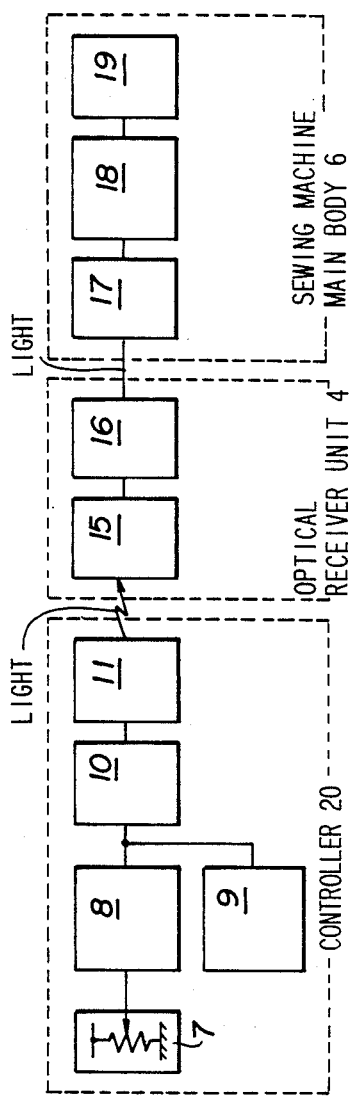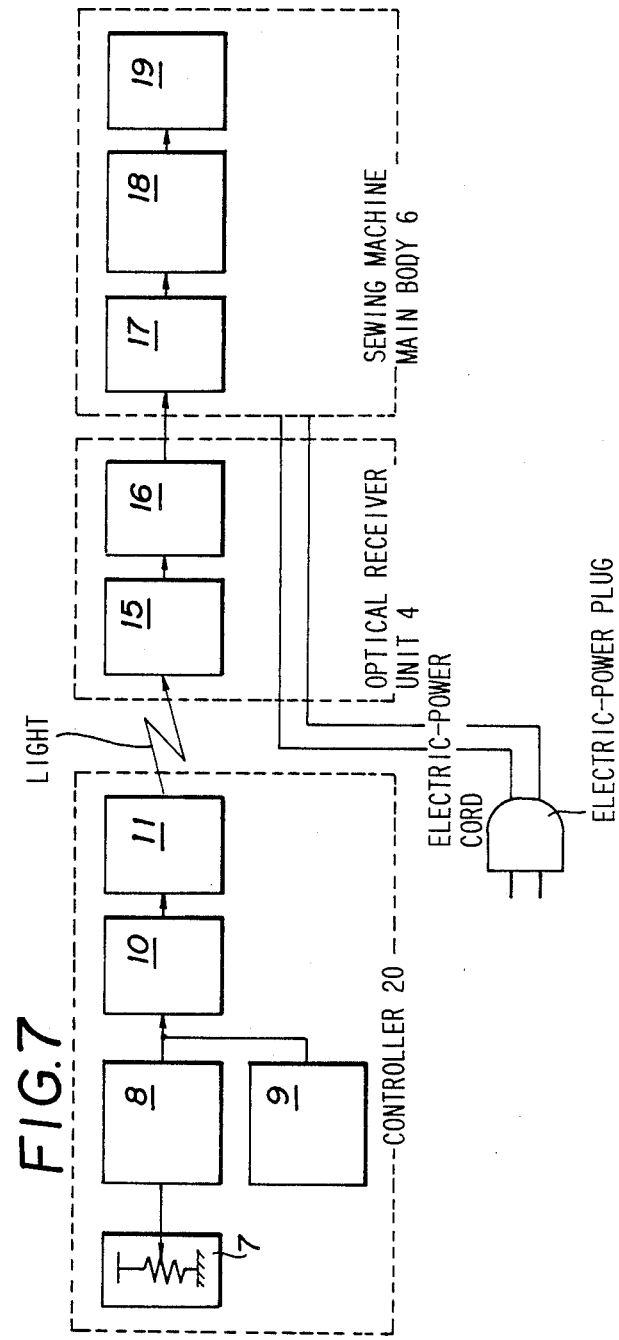

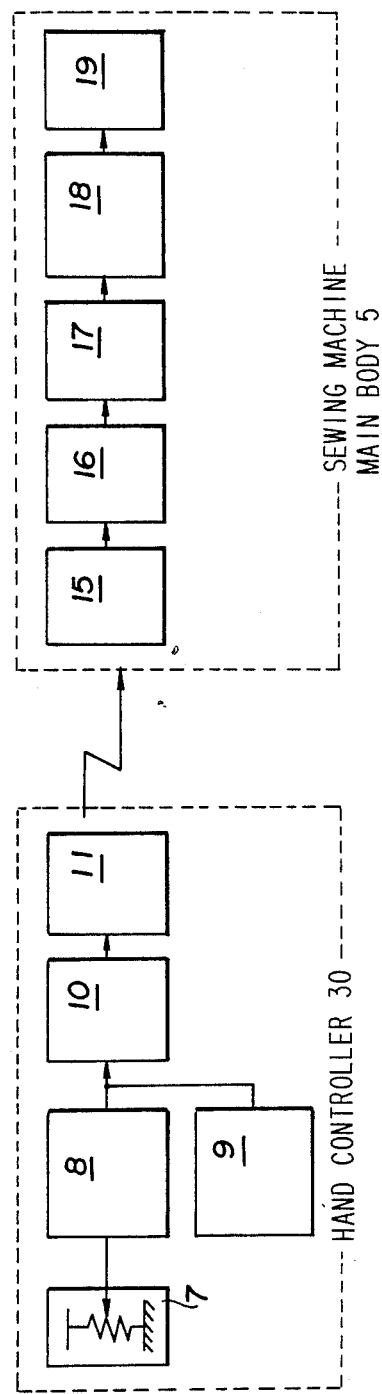

SEWING MACHINE OF A SEWING MACHINE BY WIRELESS CONTROLLER

BACKGROUND OF THE INVENTION

1. Field of the Invention

The present invention relates to a sewing machine, and more particularly to speed control of a sewing machine by a wireless controller.

2. Description of the Known Art

As is generally known, a sewing machine has a drive shaft which is rotated by a drive motor to reciprocate a needle carrying an upper thread vertically, and to rotate in synchronism with the needle a loop taker having a lower thread located therein to form stitches. The rotation speed of the drive shaft may be varied by a foot pedal controller or a hand-operated controller which is operative by a variable resistor and connected to the sewing machine by an electric transmission cord or wire. Namely, the rotation speed of the drive shaft is varied by the controller through a speed control circuit which is generally provided in the sewing machine and is operated with a voltage optionally set by the controller to control the rotation speed of the drive motor.

As a result, in case that the sewing machine has the foot-operated controller employed in connection therewith, it becomes necessary to use the electric transmission cord or wire to be connected between the foot-operated controller and the sewing machine having the drive motor provided therein. In this case, the machine user is required to deal with the transmission wire at the beginning and end of machine sewing work, that is, to connect and disconnect the controller wire to and from the sewing machine. The disconnected wire has to be put into order so as not to stand in the way. Moreover, the connected wire will often catch the user's foot by accident. In the case where the conventional hand-operated controller switch is used in connection with the sewing machine, the user is required to use one hand to operate the controller which is connected to the sewing machine by the cord or wire. This requirement is in any event distracting from the handling of the work to be stitched on the sewing machine.

In order to solve the problems inherent in the conventional controller operated sewing machine, a wireless controller of the radio wave type has been proposed for the sewing machine. However, the wireless controller of this type often suffers from radio interference. When the radio wave interference occurs during sewing operation, it may happen that the rotation speed of the sewing machine is out of control to thereby create a danger to the user.

SUMMARY OF THE INVENTION

It is an object of the present invention to provide a sewing machine substantially free from any problems inherent in the conventional sewing machine. In the sewing machine of the present invention, the conventional electric transmission wire interposed between the controller and the sewing machine is replaced with other transmission means such as an optical signal which may be used as variable control data or information substantially free from any noise problem compared to the radio wave signal, to thereby provide a wireless controller to be used in connection with a sewing machine.

BRIEF DESCRIPTION OF THE DRAWINGS

FIG. 6 is a schematic block diagram of the electrical circuit of the second embodiment of the sewing machine of the present invention;

FIG. 7 is schematic block diagram of the electrical circuit of the third embodiment of the sewing machine of the present invention;

FIG. 11 is a schematic block diagram of the electrical circuit of the fourth embodiment of the sewing machine of the present invention.

DESCRIPTION OF THE PREFERRED EMBODIMENTS

Now, embodiments of a sewing machine of the present invention will be described in detail hereinbelow with reference to the accompanying drawings.

Figure 4:
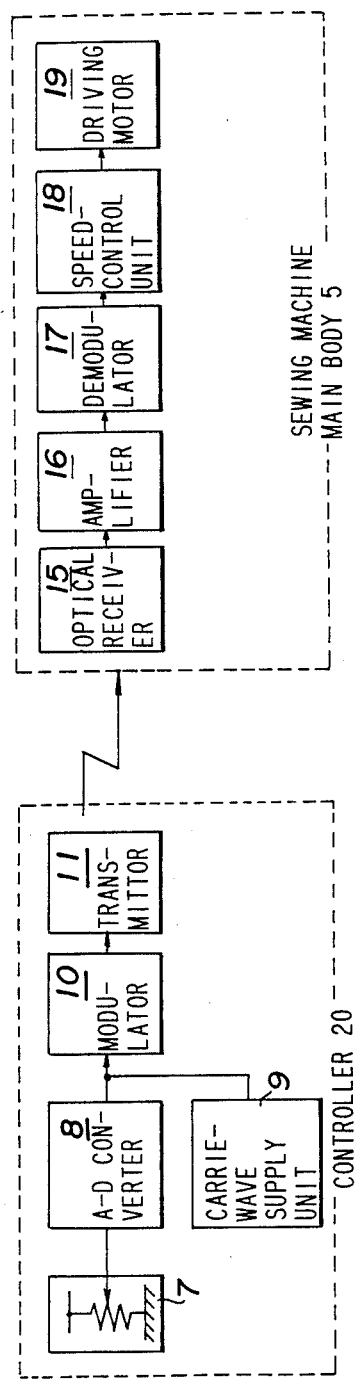
FIG. 4 is a schematic block diagram of a basic electrical circuit of the sewing machine of the present invention.

FIG. 4 is a schematic block diagram of a basic electrical circuit of the sewing machine of the present invention. In operation of the sewing machine shown in FIG. 4, when a variable resistor 7 disposed inside a wireless controller 20 is controlled by the user to select a desirable resistance variable, the thus selected resistance variable is issued from the variable resister 7 to an A-D converter 8 in which the resistance variable or analog information is translated into a serial data or digital information. As a result, the A-D converter 8 issues the serial data corresponding to such resistance variable of the thus controlled variable resister 7 to a modulator 10 in which the serial data is modulated with a carrier-wave signal having been issued from a carrier-wave supply unit 9 to produce a modulated wave or signal.

The modulated wave or signal is then transmitted by means of a transmitter 11 to an optical receiver 15 of the sewing machine main body 5 as shown in FIG. 4. In the sewing machine main body 5, after receipt of the modulated wave or signal, the optical receiver 15 issues a signal based on the modulated wave to an amplifier 16 in which the modulated wave or signal is amplified to produce an amplified signal based on the modulated wave which is then issued from the amplifier 16 to a demodulator 17 in which only the serial data contained in the amplified signal is detected to enable a speed control unit 18 to control a rotational speed of a driving motor 19 on the basis of the thus detected serial data.

Schematic block diagrams of the embodiments of the sewing machine of the present invention will be now described with reference to FIGS. 5 to 7.

First, each of the schematic block diagrams of the wireless controller 20 will be described.

Figure 5:
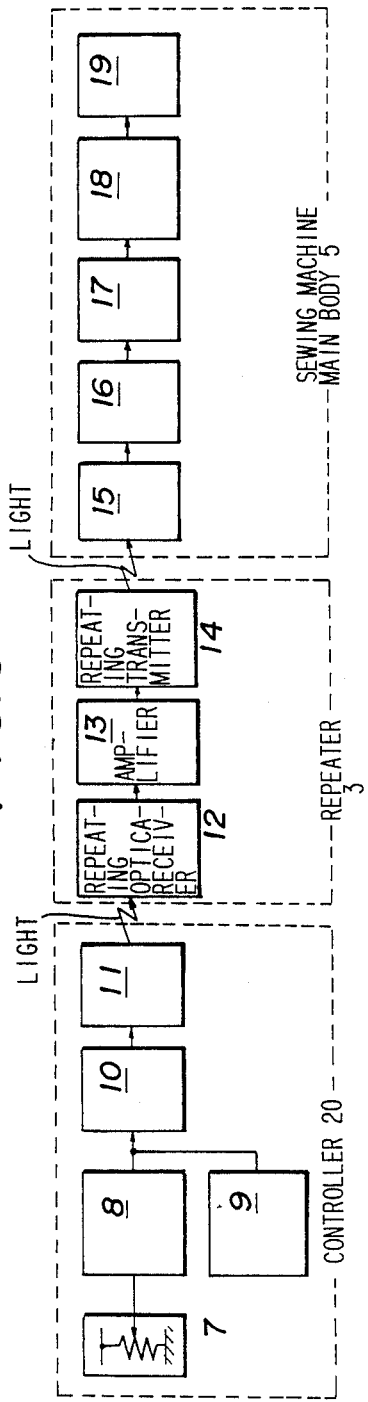
FIG. 5 is a schematic block diagram of the electrical circuit of the first embodiment of the sewing machine of the present invention.

As shown in FIGS. 5 to 7, in the A-D converter 8, a voltage corresponding to a manipulated variable or resistance variable of the variable resister 7 for controlling a rotational speed of the driving motor 19 of the sewing machine of the present invention is translated into a digital value which forms the serial data issued from the A-D converter 8.

The carrier-wave supply unit 9 issues a carrier wave or carrier current having a suitable modulation frequency to the modulator 10.

In the modulator 10, the serial data issued from the A-D converter 8 is modulated with the carrier-wave issued from the carrier-wave supply unit 9 to produce the modulated wave which is issued from the modulator 10 to the transmitter 11.

Then, the modulated wave is received by the transmitter 11 which transmits the thus received modulated wave by means of an optical signal to the optical receiver 15 of the sewing machine main body 5.

Now, the sewing machine main body 5 shown in FIG. 5, an optical receiver unit 4 shown in FIGS. 6 and 7, and each of the schematic block diagrams of the sewing machine main body 6 shown in FIGS. 6 and 7 will be described.

As shown in FIG. 5, in the sewing machine main body 5, the optical receiver 15 receives the optical signal or light having passed through a repeating transmitter 14 or the transmitter 11.

Then, in the sewing machine main body 5, the optical receiver 15 issues a signal based on the optical signal to the amplifier B16 in which the signal is amplified.

The thus amplified signal based on the optical signal is issued from the amplifier B16 to the demodulator 17 in which the carrier-wave component of the amplified signal is removed to detect the original serial data.

The thus detected serial data is issued from the demodulator 17 to the speed-control unit 18 through which a rotational speed of the driving motor 19 is controlled on the basis of the serial data.

Figure 8:
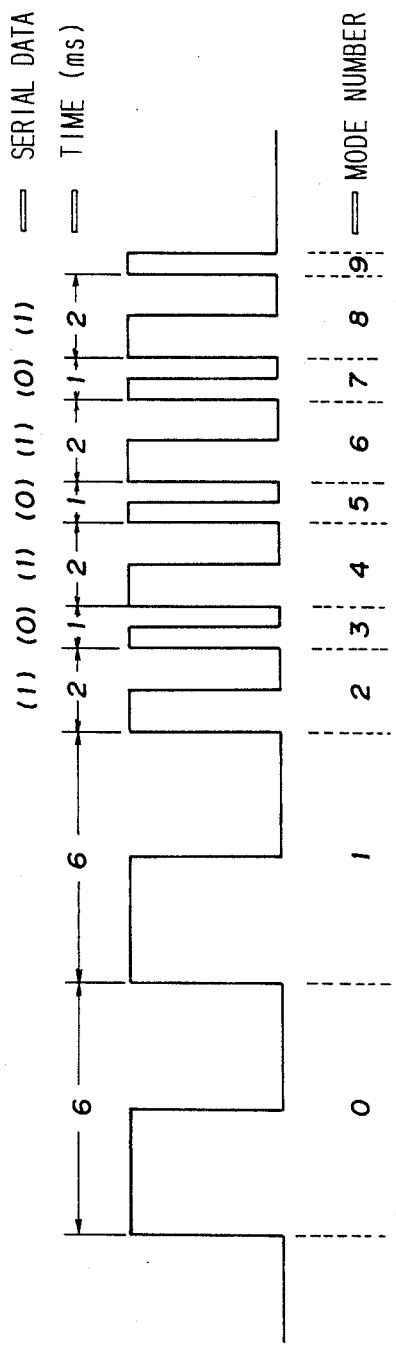
FIG. 8 is a diagram of an example of a seven-bit data (1010101) serving as the serial data which is transmitted through the A-D converter of the wireless controller of the sewing machine of the present invention.

FIG. 8 is a diagram of an example of a seven-bit data (1010101) serving as the serial data which is transmitted through the A-D converter 8 of the wireless controller 20 of the sewing machine of the present invention.

In the sewing machine of the present invention having the above construction, if there is not provided a repeater 3, there is a fear that the optical signal issued from the transmitter 11 is prevented from being surely received by the optical receiver 15 of the sewing machine main body 5 when the wireless controller 20 is disposed under the sewing table of the sewing machine in use, because there is a fear that the optical signal is blocked off with any of the sewing table, the work piece or cloth being sewed and the user's own leg operating the wireless controller 20 of the sewing machine. In order to eliminate the above fear, the repeater 3 is provided in the sewing machine of the present invention as shown in FIG. 5.

Now, the schematic block diagram of the repeater 3 will be described.

As shown in FIG. 5, in the repeater 3, the optical signal issued from the transmitter 11 of the wireless controller 20 is received by a repeating optical receiver 12 which issues a signal based on the optical signal to an amplifier A13.

Then, the amplifier A13 receives the signal issued from the repeating optical receiver 12 and amplifies it to produce an amplified signal based on the optical signal, which amplified signal is issued from the amplifier A13 to the repeating transmitter 14.

After receipt of the thus amplified signal, the repeating transmitter 14 issues another optical signal based on the amplified signal to the optical receiver 15 of the sewing machine main body 5.

Now, the sewing machine of the present invention having the above construction will be entirely described with reference to FIG. 1 which illustrates the perspective view of the sewing machine of the present invention as a whole.

Figure 1:
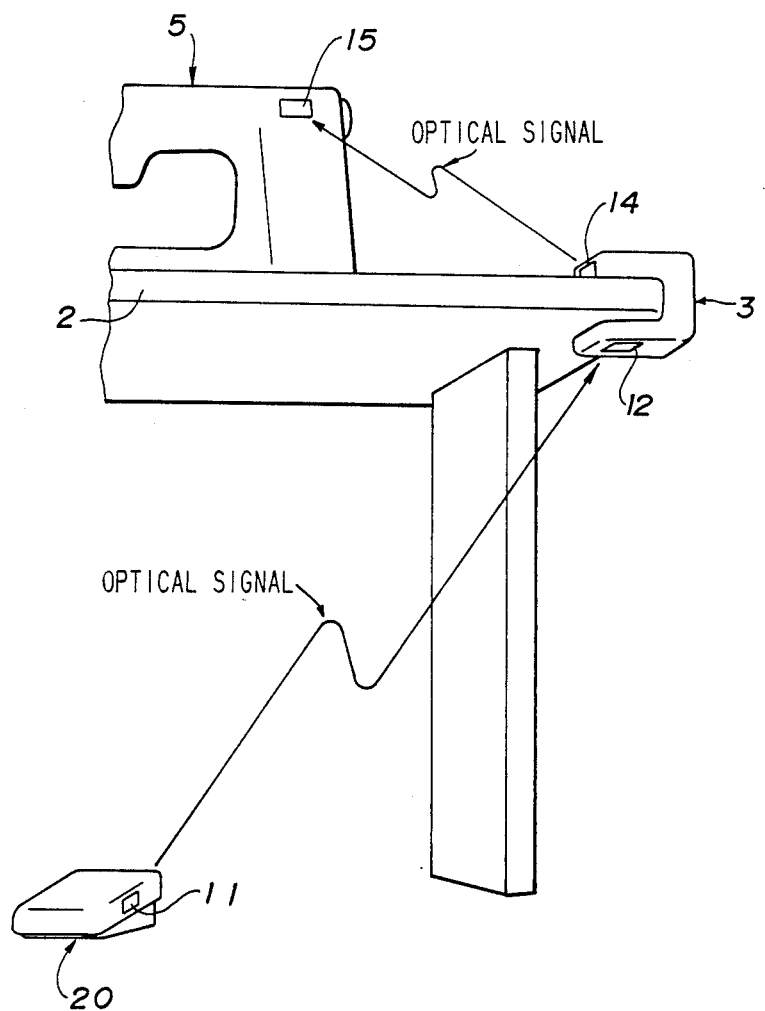
FIG. 1 is a perspective view of a first embodiment of the sewing machine of the present invention.

As shown in FIG. 1, in a side surface of the wireless controller 20 of the sewing machine of the present invention is provided the transmitter 11 which is oriented toward the repeating optical receiver 12 of the repeater 3. On the other hand, in a front surface of the sewing machine main body 5 disposed on the sewing table 2 of the sewing machine is provided the optical receiver 15. Consequently, the repeater 3 is interposed between the transmitter 11 of the wireless controller 20 and the optical receiver 15 of the sewing machine main body 5. In other words, the repeating optical receiver 12 of the repeater 3 is oriented toward the transmitter 11 of the wireless controller 20 disposed on a suitable supporting floor. On the other hand, the repeating transmitter 14 of the repeater 3 is oriented toward the optical receiver 15 of the sewing machine main body 5 as shown in FIG. 1.

Figure 9:
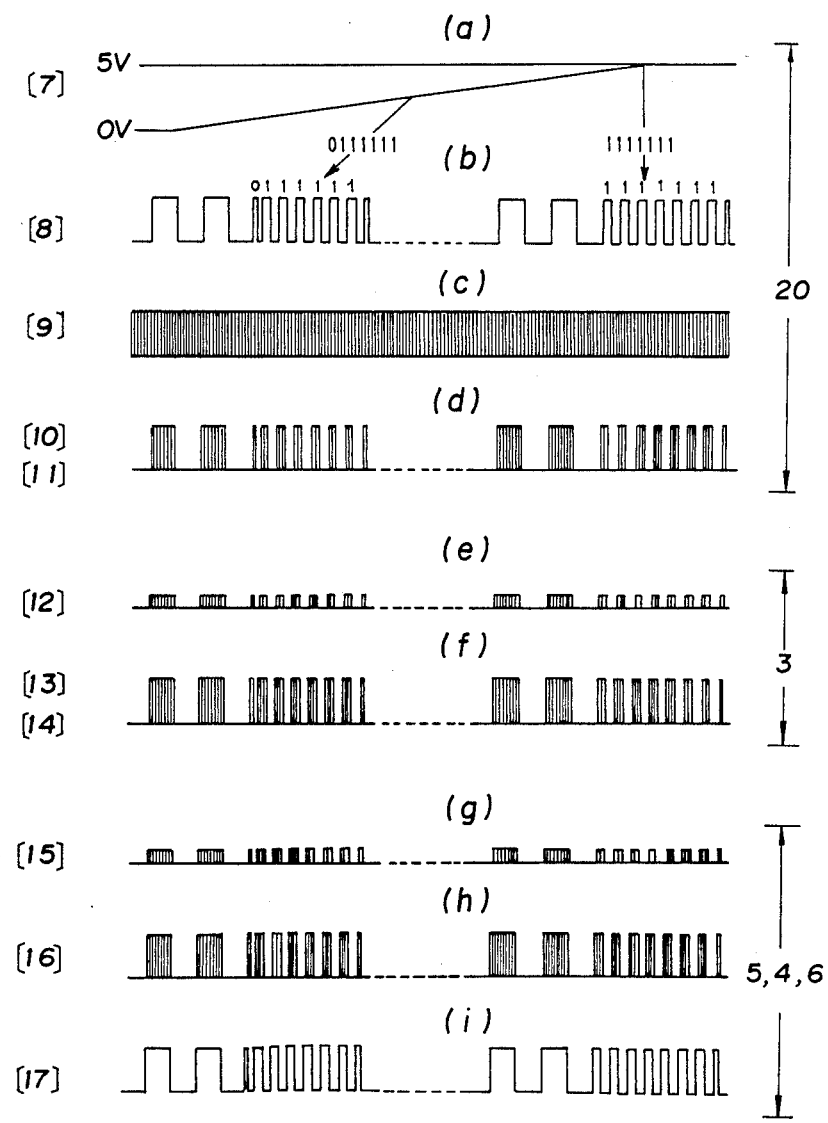
FIG. 9 is a diagram illustrating the output signals issued from the schematic block diagrams of the electrical circuits shown in FIGS. 4 to 7.

As shown in FIG. 5, the sewing machine of the present invention is operated as follows:

When the user controls the variable resistor 7 disposed inside the wireless controller 20 of the sewing machine to select a desired resistance variable, such desired resistance variable is issued from the variable resister 7 to the A-D converter 8 as shown in FIG. 5, in which A-D converter 8 the resistance variable or analog information is translated into a serial data or digital information so that a serial data corresponding to such desired resistance variable is issued from the A-D converter 8 to the modulator 10. An example of the serial data is shown in FIG. 9(b). In the modulator 10, the serial data is modulated with the carrier wave issued from the carrier-wave supply unit 9 to produce a modulated wave an example of which is shown in FIG. 9 (d). The thus produced modulated wave is then issued from the modulator 10 to the transmitter 11 which transmits an optical signal based on the modulated wave to the repeating optical receiver 12 of the repeater 3 as shown in FIG. 5. An example of the optical signal transmitted from the transmitter 11 to the repeating optical receiver 12 is shown in FIG. 9 (e).

After receipt of the optical signal based on the modulated wave, the repeating optical receiver 12 of the repeater 3 issues a signal based on the optical signal to the amplifier A13 in which the signal based on the optical signal is amplified to produce an amplified signal. Such amplified signal based on the modulated wave is then issued from the amplifier A13 to the repeating transmitter 14 of the repeater 3. After receipt of the amplified signal, the repeating transmitter 14 transmits another optical signal based on the amplified signal to the optical receiver 15 of the sewing machine main body 5 as shown in FIG. 5. An example of such another optical signal transmitted from the repeating transmitter 14 to the optical receiver 15 of the sewing machine main body 5 is shown in FIG. 9 (f).

An example of the optical signal received by the optical receiver 15 is shown in FIG. 9 (g), which optical signal is then issued from the optical receiver 15 to the amplifier B16 of the sewing machine main body 5 and amplified therein to produce another amplified signal. An example of such another amplified signal is shown in FIG. 9 (h), which signal is issued from the amplifier B16 to the demodulator 17 in which the serial data contained in the another amplified signal is detected. An example of the thus detected serial data is shown in FIG. 9 (i). Consequently, a rotational speed of the driving motor 19 of the sewing machine of the present invention is suitably controlled by the user through the speed-control unit 18 of the sewing machine main body 5 according to the thus demodulated serial data.

In the above embodiment of the sewing machine of the present invention, the repeater 3 is employed to surely transmit the optical signal to the optical receiver 15 of the sewing machine main body 5. However, it is also possible that, in order to surely transmit the optical signal to the optical receiver 15 of the sewing machine main body 5 without employing the repeater 3, the optical receiver 15 is separated from the sewing machine main body 5 while electrically connected therewith through a suitable communication cord or wires.

Figure 2:
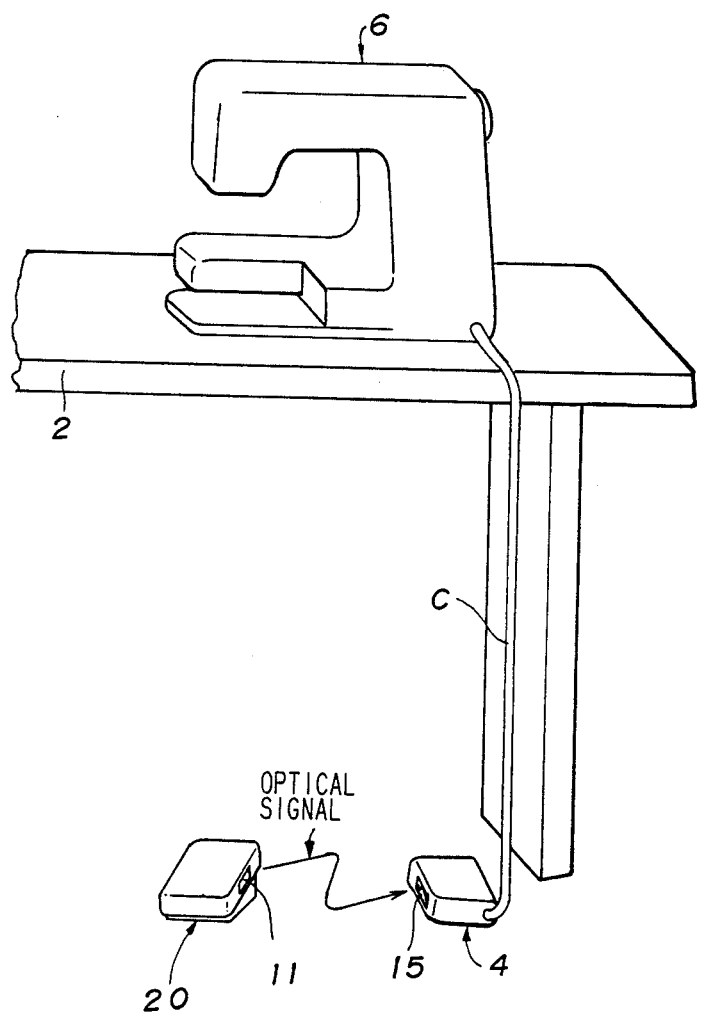
FIG. 2 is a perspective view of a second embodiment of the sewing machine of the present invention.

In this case or another embodiment of the sewing machine of the present invention, as shown in FIG. 2, the transmitter 11 of the wireless controller 20 is provided in a side surface of the controller 20, while the optical receiver 15 of the optical receiver unit 4 is oppositely disposed from the transmitter 11 of the wireless controller 20. On the other hand, the optical receiver unit 4 is electrically communicated with the sewing machine main body 5 through a suitable communication cord C, which sewing machine main body 5 is disposed on the sewing table as shown in FIG. 2.

Operation of the above other embodiment of the sewing machine of the present invention will be described with reference to FIG. 6.

As shown in FIG. 6, when the user controls the variable resistor 7 of the wireless controller 20 to select a desirable resistance variable, such resistance variable is issued from the variable resistor 7 to the A-D converter 8 in which the resistance variable or analog information is translated into the serial data or digital information which is issued from the A-D converter 8 to the modulator 10 in which such serial data is modulated with the carrier wave having been issued from the carrier-wave supply unit 9 to the modulator 10 to produce a modulated wave or signal. As a result, the modulator 10 issues the modulated wave or signal to the transmitter 11 through which the modulated wave is transmitted to the optical receiver 15 of the optical receiver unit 4 by means of the optical signal or light.

In the optical receiver unit 4, after receipt of the optical signal based on the modulated wave, the optical receiver 15 issues a signal based on the modulated wave to the amplifier B16 in which a signal based on the modulated wave is amplified to produce an amplified signal which is then transmitted to the sewing machine main body 6 through the communication cord C. In the sewing machine main body 6, after receipt of such amplified signal based on the modulated wave, the demodulator 17 detects the original serial data contained in the amplified signal. The thus detected serial data is then issued from the demodulator 17 to the speed-control unit 18 to enable it to control the rotational speed of the driving motor 19 according to the serial data.

Figure 3:
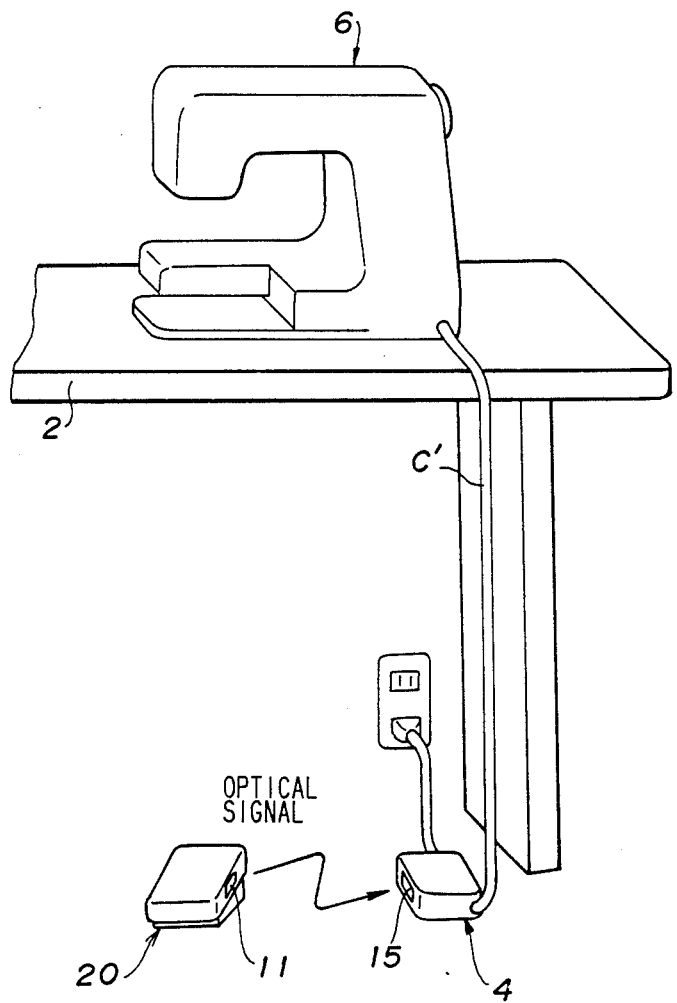
FIG. 3 is a perspective view of a third embodiment the sewing machine of the present invention.

As shown in FIG. 3, there is yet another embodiment of the sewing machine of the present invention, in which embodiment the optical receiver unit 4 shown in FIG. 6 is integrally formed with an electric-power cord of the sewing machine main body 6.

In this embodiment shown in FIG. 3, the transmitter 11 is provided in a side surface of the wireless controller 20. On the other hand, the optical receiver 15 of the optical receiver unit 4 is oppositely disposed from the transmitter 11 of the wireless controller 20. The optical receiver unit 4 is electrically connected with the sewing machine main body 6 through a suitable communication cord C' which is integrally formed with the electric-power cord of the sewing machine main body 6.

In operation of the embodiment of the sewing machine of the present invention shown in FIG. 3, as shown in FIG. 7, when the user controls the variable resistor 7 of the wireless controller 20 to select a desirable resistance variable, the thus selected desirable resistance variable is issued from the variable resistor 7 to the A-D converter 8 in which the resistance variable or analog information is translated into the serial data or digital information which is issued from the A-D converter 8 to the modulator 10 in which the serial data is modulated with the carrier wave having been issued from the carrier-wave supply unit 9 to the modulator 10 to produce a modulated wave based on the serial data. The thus produced modulated wave based on the serial data is then issued from the modulator 10 to the transmitter 11. After receipt of such modulated wave or signal, the transmitter 11 transmits an optical signal based on the modulated wave to the optical receiver 15 of the optical receiver unit 4.

In the optical receiver unit 4, after receipt of the optical signal, the optical receiver 15 issues a signal based on the optical signal or modulated wave to the amplifier B16 in which the signal based on the modulated wave is amplified to produce an amplified signal which is transmitted to the demodulator 17 of the sewing machine main body 6 through the communication cord C' which is integrally formed with the electric-power cord. After receipt of the amplified signal, the demodulator 17 detects the original serial data contained in the amplified signal, which serial data is then issued from the demodulator 17 to the speed-control unit 18 to enable it to control a rotational speed of the driving motor 19 of the sewing machine main body 6 according to the serial data.

Figure 10:
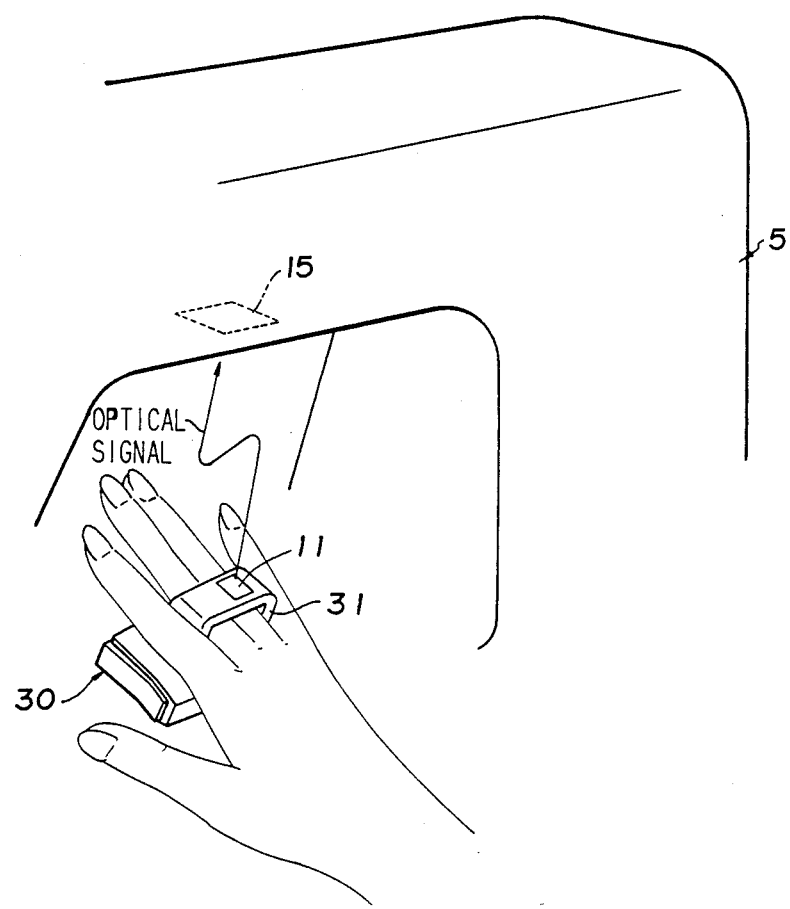
FIG. 10 is a perspective view of a fourth embodiment of the sewing machine of the present invention.

As shown in FIG. 10, there is still a further embodiment of the sewing machine of the present invention, in which embodiment the above foot-operated wireless controller 20 is replaced with a hand controller 30 mounted on the user's hand in use.

The hand controller 30 employs the same electrical circuit as that employed in the above foot-operated controller 20, and is provided with the transmitter 11. In this embodiment, the optical receiver 15 is so mounted on the sewing machine main body 5 as to be oriented downward as shown in FIG. 10.

The embodiment of the sewing machine of the present invention shown in FIG. 10 is operated as follows:

In the schematic block diagram of this embodiment shown in FIG. 11, when the user controls the variable resistor 7 of the hand controller 30 to select a desirable resistance variable, the thus selected resistance variable is issued from the variable resister 7 to the A-D converter 8 in which the resistance variable or analog information is translated into the serial data or digital information which is issued from the A-D converter 8 to the modulator 10 in which the serial data is modulated with the carrier wave having been issued from the carrier-wave supply unit 9 to the modulator 10 to produce the modulated wave based on the serial data. The modulated wave or signal is then issued from the modulator 10 to the transmitter 11 through which the modulated wave is transmitted to the optical receiver 15 of the sewing machine main body 5 by means of the optical signal or light. In the sewing machine main body 5, after receipt of the modulated wave in the form of the optical signal, the optical receiver 15 issues a signal based on the modulated wave to the amplifier B16 in which the signal is amplified to produce an amplified signal based on the modulated wave. After that, the thus amplified signal is issued from the amplifier B16 to the demodulator 17 in which the original serial data contained in the amplified signal is detected and issued to the speed-control unit 18 to enable it to control a rotational speed of the driving motor 19 of the sewing machine main body 5 according to the serial data.

As described above, in the sewing machine provided with the conventional controller, the user often struggles with the communication wires interposed between the controller and the sewing machine main body. In use, there is also a fear that the user catches his foot in the communication wires by accident. In contrast with this, since communication wires are not employed between the controller and the sewing machine main body of the sewing machine of the present invention, and further since the optical signal substantially free from any noise problem is employed as a communication medium in the sewing machine of the present invention, the sewing machine of the present invention enables the user to conduct a sufficiently sure and safe sewing operation. Further, in case that there is some light-blocking member such as a sewing table between the controller and the sewing machine main body of the sewing machine: the repeater 3 is provided in the sewing machine of the present invention to ensure the optical signal issued from the transmitter of the controller reliable reception by the optical receiver of the sewing machine main body; or the optical receiver is separated from the sewing machine main body to ensure reliable reception of the optical signal issued from the transmitter. Since the sewing machine of the present invention has the above construction, it is excellent in easiness in use, particularly in portability.

What is claimed is:

1. A sewing machine having a drive shaft rotatable to reciprocate a needle carrying an upper thread vertically, and to rotate in synchronism with said needle a loop taker having a lower thread located therein to form stitches, a drive motor rotatable in one direction to rotate the drive shaft, and a separate foot pedal controller operative by a variable resistor to produce an optional set voltage for operating a speed control circuit, said sewing machine also comprising:
    means for converting said set voltage to a corresponding digital value and producing a series of data on the basis of said digital value;
    means for producing carrier waves for carrying said series of data;
    means for modulating said series of data by means of said carrier waves and producing modulated waves;
    transmitter means responsive to said modulated waves to produce a corresponding light signal;
    means for receiving said light signal; and
    means for demodulating said received light signal for causing said speed control circuit to control the rotation speed of said drive motor.

2. The sewing machine as defined in claim 1, further comprising relay means including a receiver for receiving said light signal produced from said transmitter means, an amplifier for amplifying said light signal received by said relay receiver, and a repeating transmitter for transmitting said amplifier light signal to said light signal receiving means.

3. The sewing machine as defined in claim 1, wherein said converting means (8), said carrier wave producing means (9), said modulating means (!0) and said transmitter means (11) constitute said controller separated from said sewing machine.

4. The sewing machine as defined in claim 1, wherein said light signal receiving means (15), said demodulating means (17) and said control means (18) are located in said sewing machine.

5. The sewing machine as defined in claim 2, wherein said relay means (3) is separate from said sewing machine and located between said controller and said sewing machine.

6. A sewing machine having a drive shaft rotatable to reciprocate a needle carrying an upper thread vertically, and to rotate in synchronism with said needle a loop taker having a lower thread located therein to form stitches, a drive motor rotatable in one direction to rotate the drive shaft, a speed control circuit for controlling the rotation speed of the drive motor and a separate foot pedal controller operative by a variable resistor to produce an optional set voltage for operating said speed control circuit, said sewing machine also comprising:
    means for converting said set voltage to a corresponding digital value and producing a series of data on the basis of said digital value;
    means for producing carrier waves for carrying said series of data;
    means for modulating said series of data by means of said carrier waves and for producing modulated waves;
    transmitter means responsive to said modulated waves to produce a corresponding light signal;
    means for receiving said light signal;
    means for amplifying said light signal received by said light receiving means; and
    means for demodulating said amplified light signal and for causing said speed control circuit to control the rotation speed of said drive motor.

7. The sewing machine as defined in claim 6, wherein said converting means (8), said carrier wave producing means (9), said modulating means (10) and said transmitter means (11) constitute said controller separated from said sewing machine.

8. The sewing machine as defined in claim 6, wherein said demodulating means (17) and said control means (16) are located in said sewing machine.

9. The sewing machine as defined in claim 6, wherein said light signal receiving means (15) and said amplifying means (16) constitute a light signal receiving unit (4) which is separate from said sewing machine but electrically connected to said demodulating means located in said sewing machine.

10. The sewing machine as defined in claim 9, wherein said light signal receiving unit is electrically connected to a power source through a power source cord.

11. A sewing machine having a drive shaft rotatable to reciprocate a needle carrying an upper thread vertically and to rotate in synchronism with said needle a loop taker having a lower thread located therein to form stitches, a drive motor rotatable in one direction to rotate the drive shaft, and a separate hand-held controller adjustably operative by a variable resistor to produce an optional set voltage for operating a speed control circuit, said sewing machine also comprising:

means for converting said set voltage to a corresponding digital value and producing a series of data on the basis of said digital value;

means for producing carrier waves for carrying said series of data;

means for modulating said series of data by means of said carrier waves and producing modulated waves;

transmitter means responsive to said modulated waves to produce a corresponding light signal;

means for receiving said light signal; and means for demodulating said received light signal for causing said speed control circuit to control the rotation speed of said drive motor.

* * * * *